Figure 2:
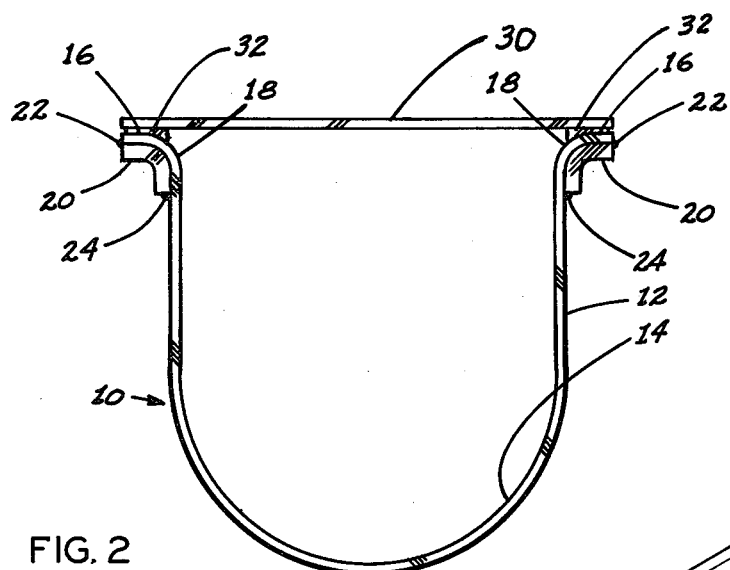

United States Patent [19]

Buss

[11] 4,436,518

[45] Mar. 13, 1984

[54] METAL TROUGH

[76] Inventor: David L. Buss, 120 E. Kraus St., St. Louis, Mo. 63111

[21] Appl. No.: 186,899

[22] Filed: Sep. 15, 1980

[51] Int. Cl.$^3$ .............................................. B65G 15/60
[52] U.S. Cl. ..................................... 428/595; 428/598; 193/2 R; 193/3; 193/6; 193/29; 198/656; 198/657; 52/11; 52/12; 52/730; 52/731
[58] Field of Search ................ 428/595, 598; 193/2 R, 193/3, 6, 29; 198/656, 657; 52/11, 12, 730, 731

[56] References Cited

U.S. PATENT DOCUMENTS

| | | | |
|---|---|---|---|
| 687,059 | 11/1901 | Pelton | 52/730 |
| 1,133,692 | 3/1915 | Adams | 193/2 R |
| 2,528,679 | 11/1950 | Ballard et al. | 198/666 |
| 3,227,261 | 1/1966 | Hawley | 198/546 |
| 3,433,269 | 3/1969 | Sackett, Sr. | 52/731 |
| 3,508,405 | 4/1970 | Koch | 192/2 R |
| 4,090,604 | 5/1978 | Reifert | 198/657 |

FOREIGN PATENT DOCUMENTS 125748 4/1919 United Kingdom .................. 52/730

OTHER PUBLICATIONS

American Welding Society, *Welding Terms and Definitions*, AWS A30-76, Miami, Fla., 1976.

*Primary Examiner*—Veronica O'Keefe
*Attorney, Agent, or Firm*—John D. Pope, III; Edward R. Weber

[57] ABSTRACT

A flanged trough is provided having flanges along each side of the trough with a smooth continuous curve between the flanges and the body of the trough and a bar of metal welded along the underside of each longitudinal edge of the metal sheet before the flanges are formed. The junction between the metal bars and the flanges and the welds can be covered with a sealant to form a sanitary seal. A lid and gasket can be placed over the trough to seal the contact area of material in the trough from the junction between the metal bars and the flanges of the trough to form a weather tight, dust tight and gas tight conduit.

5 Claims, 3 Drawing Figures

METAL TROUGH

The present invention relates to a metal trough and its method of manufacture, and particularly to the flanges of a metal trough.

Flanges for a metal trough are typically of two types, the angle flange and the formed flange. In the angle flange, a length of angle iron is welded along the edges of a trough to form flanges on either side. In a formed flange, the edges of the trough are bent away from the body of the trough to form flanges.

The flanges of a formed flange trough have continuous surfaces between the flange and the body of the trough which may be easily cleaned, while the angle flange trough has improved structural support and rigidity.

An angle flange trough has the disadvantage that a weather, dust or gas tight seal is not provided between the body of the trough an the flange unless a continuous weld is made between the flange and the body of the trough. The use of a continuous weld however, causes warpage and distortion. Also, a continuous weld customarily has cracks and crevices which retain dirt and food particles and make thorough cleaning very difficult. For this reason, the angle flange trough is not used for handling food products.

The formed flange trough while being easy to clean, does not have the rigidity needed in many applications.

Among the purposes of the present invention is to provide a flanged trough having structural support and rigidity and which is easy to clean because of the smooth curve between the flange and the body of the trough. It is also an object of the present invention to provide a flanged trough which provides a weather tight, dust tight and gas tight conduit. It is a further object of the invention to provide a trough in which the junction of the supporting member and the flanges of the trough are sealed outside the area of contact with material in the trough. Other objects and features will be in part apparent and in part pointed out hereinafter.

The invention accordingly comprises the constructions and methods hereinafter described, the scope of the invention being indicated in the following claims.

Figure 1:
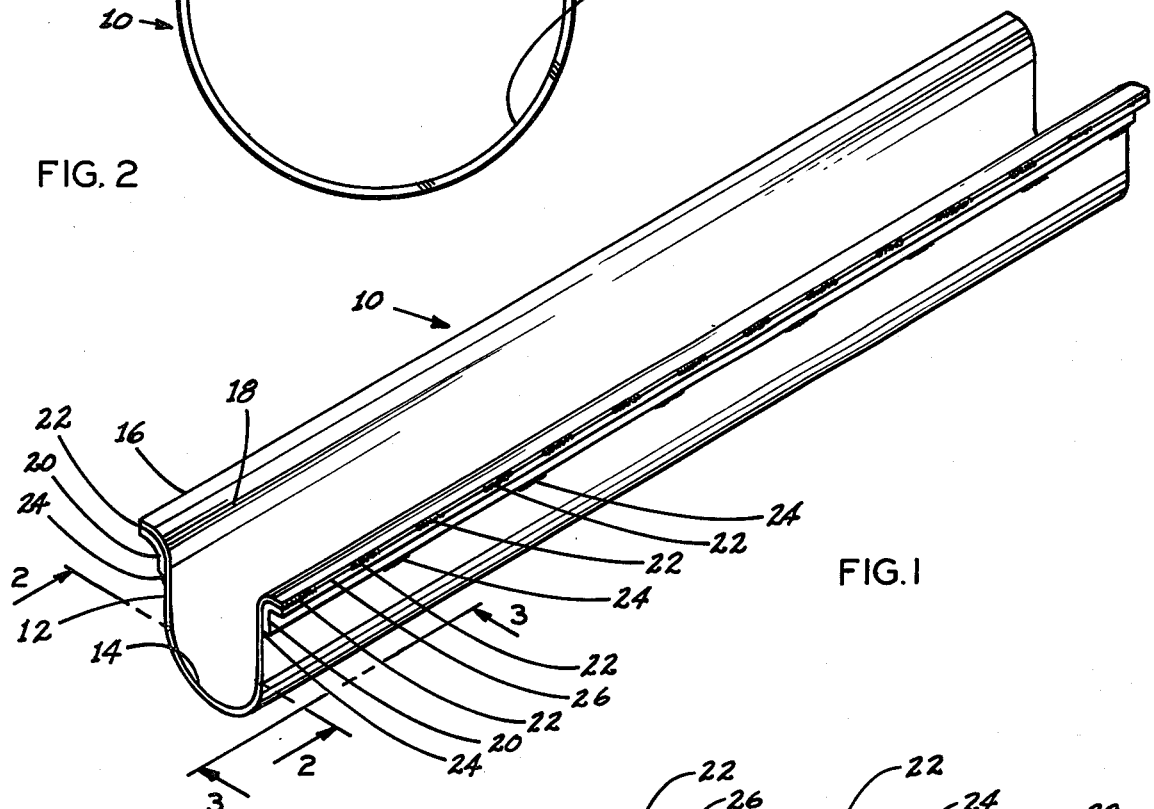
Figure 3:
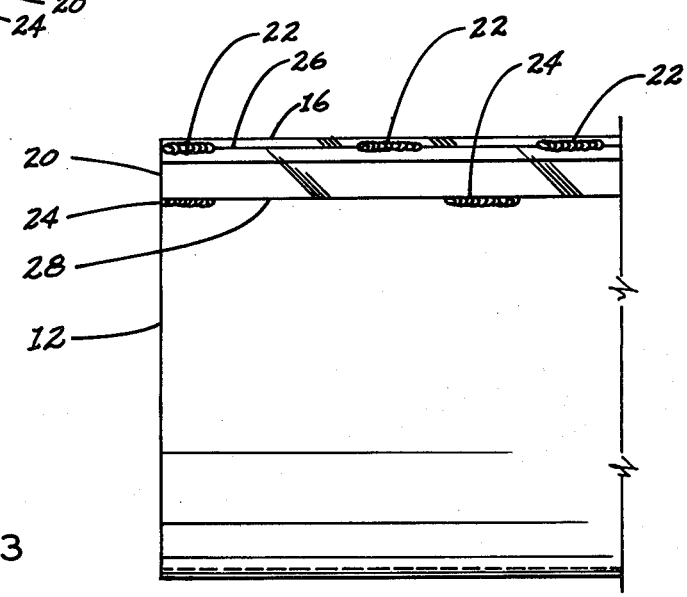

In the accompanying drawings, in which one of the various possible embodiments of the invention is illustrated, FIG. 1 is an overall view of the trough of the invention;

FIG. 2 is a view of a trough of the invention taken along section line 2—2 of FIG. 1 with a cover added; and FIG. 3 is an elevation illustrating a portion of the side of a trough of the invention taken along section line 3—3 of FIG. 1.

Corresponding reference characters indicate corresponding parts throughout the drawings.

FIGS. 1 and 2 show a trough 10 having a single metal sheet 12 forming the body of the trough. Sheet 12 may be made of mild steel or alloys such as is known for the fabrication of metal troughs.

Metal trough 10 has a rounded bottom 14 such as is used in tube type troughs for screws, chutes or other applications. The present invention can also be used in box type troughs wherein the bottom of the trough is square.

The edges of the trough are rounded to form flanges 16 having a smooth curve 18 between the trough body and flange 16. A metal plate or bar 20 is first welded to the underside of flanges 16 by welds 22 and 24 before the edges are rounded.

Welds 22 and 24 are preferred to be intermittant type welds such as shown in FIG. 3.

Bars 20 are welded at the edge of the sheet of metal before the trough is formed. The flat metal, which may be sized for the particular application or to the limits of the sheet metal stock available, is then formed by a press break having male and female dies into a trough as shown in FIG. 1 with metal bars 20 on the underside of flanges 16. The press break bends or forms the edges into flanges 16 having a smooth bend 18 between the flanges and the body of the trough.

The resulting trough has the rigidity of an angle flange trough without the warpage or distortion generally associated with an angle flange trough while providing a smooth surface 18 between flange 16 and the body of trough 10 such that trough 10 is easily cleaned. This is particularly important in the food industry as bends 18 have no joints or seams in which dirt or particles of food might be retained.

As shown in FIGS. 1 and 2, each bar 20 is generally positioned such that its edge is even with the edge of the metal sheet before bars 20 are welded into place. The junction where bars 20 and the metal sheet come together can be sealed by a sealing means at joints 26 and 28 of FIG. 3. The cracks and crevices of welds 22 and 24 can also be covered with a sealant. The sealant may be butyl rubber or a similar sealant to provide a sanitary seal for use in the food industry.

As shown in FIG. 2, trough 10 may be covered with a cover or lid 30 having a gasket 32 between lid 30 and flanges 16 of the trough. With such a lid, the trough forms a weather tight, dust tight and gas tight conduit. Gasket 32 also separates the junctions 26 between bars 20 and flange 16 from any product in trough 10. Lid 30 may be clamped or otherwise secured to the flanges of the trough to form the desired seal between lid 30 and flanges 16.

It will thus be seen that the invention provides a flanged trough especially valuable in the food industry which may be easily cleaned, where the junction between the supporting member and the trough is outside the contact area of material in the trough, where the trough has the structural support and rigidity of an angle flange trough but does not have the warpage or distortion associated with such a trough.

In view of the above, it will be seen that the several objects of the invention are achieved and other advantageous results obtained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A trough comprising a length of sheet metal formed into a trough having flanges along each side of the trough with a smooth continuous curve between the flanges and the body of the trough, and a bar of metal welded along the underside of each longitudinal edge of said metal sheet before said flanges are formed; said bar being formed simultaneously with said sheet, so as to produce a flange reinforcement having a smooth continuous curve, which curve is substantially identical to the smooth continuous curve of the flanges on the trough.

2. A trough according to claim 1 wherein the edges of said metal sheet and the edge of each metal bar is substantially even.

3. A trough according to claim 2 wherein the welds connecting each metal bar to said metal sheet are intermittent.

4. A trough according to claim 3 further comprising sealing means between said metal sheet and said metal bar for providing a sanitary seal.

5. A trough according to claim 4 further comprising a lid over the trough and a gasket between said ld and the flanges of said trough forming a weather tight, dust tight and gas tight conduit for material in said trough.

* * * * *